July 15, 1958 W. R. ALLISON 2,843,002
DEVICE FOR INSPECTING THE ACCURACY OF CURVATURE
OF OPTICAL MATERIAL AND LENSES
Filed Sept. 16, 1953 2 Sheets-Sheet 1
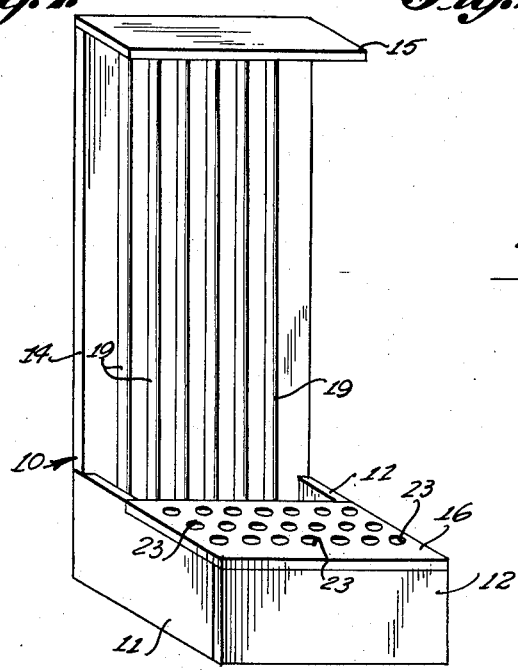
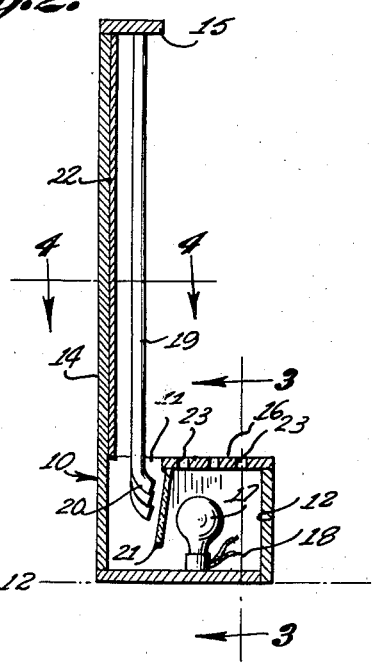
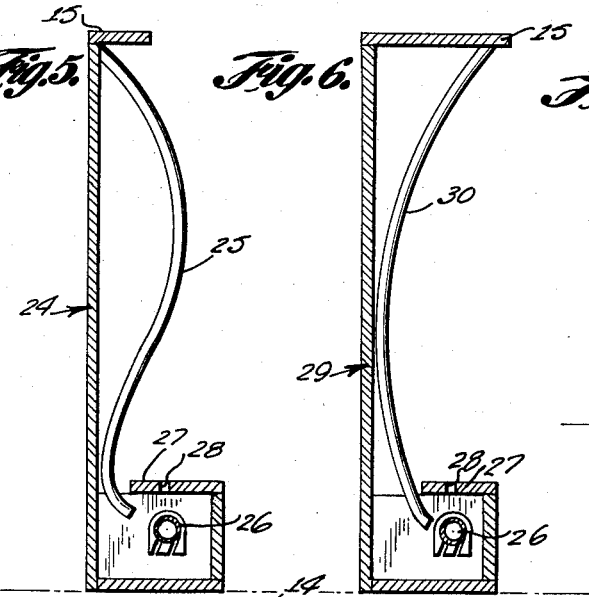
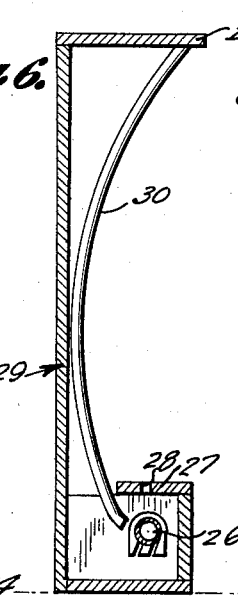
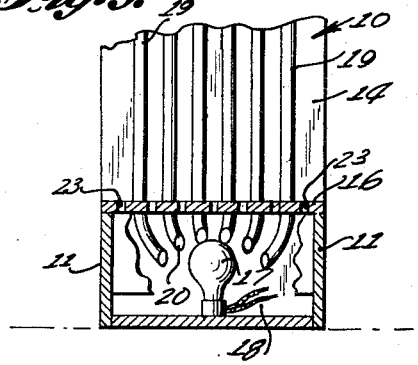
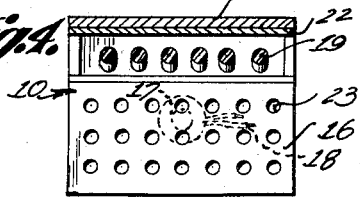
INVENTOR.
*William R. Allison*
BY *Victor J. Evans & Co.*
ATTORNEYS

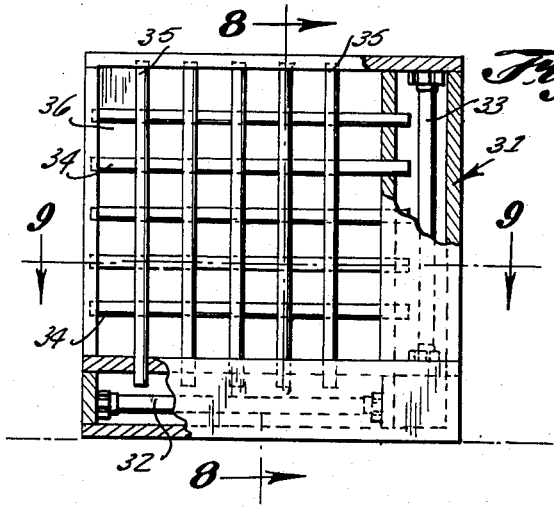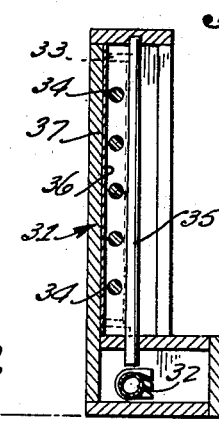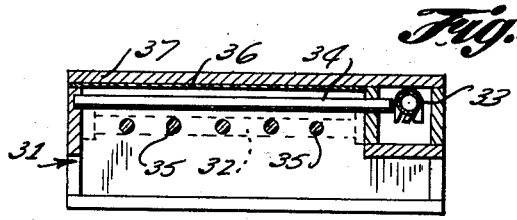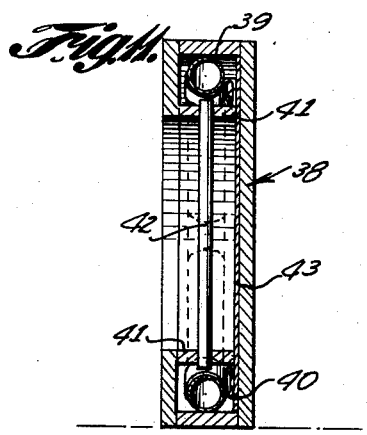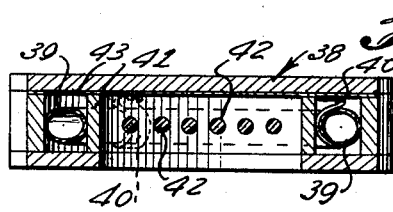

United States Patent Office 2,843,002
Patented July 15, 1958

2,843,002

DEVICE FOR INSPECTING THE ACCURACY OF CURVATURE OF OPTICAL MATERIAL AND LENSES

William R. Allison, Phoebus, Va.

Application September 16, 1953, Serial No. 380,522

1 Claim. (Cl. 88—14)

This invention relates to an inspection apparatus, and more particularly to an apparatus for inspecting the accuracy of curvature of optical material, lenses or the like.

The object of the invention is to provide an optical inspection apparatus which includes a light source, means for conducting the light rays from the light source to a particular area, and a suitable frame for supporting the light conducting members.

Another object of the invention is to provide a means or apparatus for locating irregularities of foci in optical, ophthalmic lenses, mirrors or other media, since such irregularities are detrimental or harmful to the useful function of the aforementioned articles.

A further object of the invention is to provide an inspecting device which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a perspective view of the optical inspection device, constructed according to the present invention.

Figure 2 is a vertical longitudinal sectional view taken through the inspection device of Figure 1.

Figure 3 is a sectional view taken on the line 3—3 of Figure 2.

Figure 4 is a sectional view taken on the line 4—4 of Figure 2.

Figure 5 is a vertical sectional view similar to Figure 2, but showing translucent rods of a different shape.

Figure 6 is a view similar to Figure 5 but showing another modification wherein the translucent light conducting rods are curved.

Figure 7 is a front elevational view of another modified form of the invention, and with parts broken away and in section.

Figure 8 is a sectional view taken on the line 8—8 of Figure 7.

Figure 9 is a sectional view taken on the line 9—9 of Figure 7.

Figure 10 is a front elevational view of still another modified form of the invention, and with parts broken away and in section.

Figure 11 is a sectional view taken on the line 11—11 of Figure 10.

Figure 12 is a sectional view taken on the line 12—12 of Figure 10.

Referring in detail to the drawings, there is shown in Figures 1–4, one form of the invention wherein there is provided a frame 10 that can be made of any suitable material. The frame 10 includes a pair of spaced parallel vertically disposed side walls 11, a front wall 12, and a rear wall 14. A horizontally disposed flange 15 is secured to the top of the rear wall 14. A plate or wall member 16 extends across the side walls 11, and the member 16 may be secured in place by any suitable means.

Arranged in the bottom of the frame is a light source which may be a light bulb 17 that can be connected to a suitable source of electrical energy by wires 18. Depending from the top member or flange 15 and secured thereto, is a plurality of spaced parallel rods 19 which are made of a suitable translucent material such as a plastic such as Lucite. The lower ends of the rods 19 are shaped arcuately as at 20 so that the light rays emanating from the bulb 17 can be conveyed upwardly through the rods 19. A suitable heat absorbing member 21 is provided for shielding the plastic rods 19 from the hot bulb 17, and the member 21 may be made of glass. Arranged on one side of the back wall 14 is a layer or coating 22 which is opaque to provide a non-reflective backing for luminous interstices. The top wall 16 is provided with a plurality of apertures or openings 23 whereby heat from the bulb 17 can be readily dissipated.

Referring to Figure 5 of the drawings, there is shown a modified form of the invention wherein the frame is indicated generally by the numeral 24. The device shown in Figure 5 is adapted to be used in the same manner as the device shown in Figures 1–4, and supported in the frame 24 are a plurality of translucent light conducting rods 25. Instead of using a light bulb 17, a fluorescent light 26 can be used, and the member 27 above the light source can be provided with apertures 28 for dissipating heat from the fluorescent light. However, since the fluorescent light will give off less heat than the light bulb 17, the number of apertures 28 can be less than the number of apertures 23. Also, it is not necessary to use a heat absorbing member such as the member 21 with the fluorescent light 26.

Referring to Figure 6 of the drawing, there is shown a still further modification wherein the device is indicated generally by the numeral 29. In the form of the invention shown in Figure 6 the light conducting rods are indicated by the numeral 30, and these rods 30 may have a curved shape instead of the irregular shape as shown in Figure 5.

Referring to Figures 7, 8 and 9 of the drawings there is shown a still further modified form of the invention which is indicated generally by the numeral 31. A suitable frame-work can be provided in this form of the invention for supporting a pair of fluorescent lights 32 and 33 which are arranged at right angles with respect to each other. The fluorescent light 32 may be arranged in the bottom of the frame and the fluorescent light 33 can be arranged in one side of the frame. A first set of translucent rods 34 each have an end terminating contiguous to the light 33, and a second set of spaced parallel translucent light conducting rods 35 each have an end terminating contiguous to the other fluorescent light 32. The set of rods 34 are arranged at right angles and rearwardly of the set of rods 35. A suitable opaque coating 36 is arranged contiguous to the back wall 37 of the testing apparatus.

Referring to Figures 10, 11 and 12 of the drawings, there is shown a still further modification wherein the testing apparatus is indicated generally by the numeral 38. In this form of the invention an annular light source 39 which may be fluorescent is supported in the frame, as for example by braces 40, and an annular support member or ring 41 is arranged interiorly of the light 39. The ring 41 provides a support for a plurality of spaced parallel translucent rods 42, and an opaque layer or coating 43 may be arranged on the inner surface of the frame.

From the foregoing it is apparent that a device has been provided which is especially useful for inspecting the accuracy of curvature of optical material and lenses. Thus, there is provided a means of locating irregularities of foci in optical, ophthalmic lenses, mirrors or other media, wherein such irregularities are detrimental to the useful function thereof. The frame can be made of any material and of any desired shape for supporting the various elements, and the light source serves to feed light to the translucent rods while serving to exclude the light from the operator. Where necessary suitable ventilation may be provided to carry off heat. The light source can be any suitable incandescent bulb such as the bulb 17, or it can be a tube such as a fluorescent tube 26. The translucent rods such as the rods 19 can be made of Lucite, and can be tubular, and can have any shape desired such as flat, curved, or any other shape as needed. In Figures 1 and 3 there is shown the reticular form of the translucent interstices.

The present invention can be used for testing accuracies of curvature of optical material by the reflection of light pattern designs from the surface for examination of light pattern design while moving the optical material through its meridians of curvature.

In the reflective method of testing, the technician observes the reflection of light and dark patterns as reflected from the surface of the lens or optical material being polished. Any irregularities showing up as broken lines or distortion of reflected pattern are readily observed. In the transmitted inspection, the technician looks through the optical material at the light pattern design and the lens or optical material must have one meridian of its foci parallel to this light pattern. By moving the optical element from side to side and observing the movement of the transmitted design, the optician can verify the accuracy of curvature in one meridian of foci. By rotating the lens 90 degrees the other meridian of foci can be analyzed. Any jump, broken line, or adverse movement will denote inaccuracy of curvature or other defects such as stria or wave. The present invention is not intended to be used for testing the power of foci.

In Figures 7, 8 and 9 the rods 34 and 35 provide a lattice work grille of light and dark areas which is suitable for inspection of reflected surfaces on optical or other material. The lights 32 and 33 are shielded or housed as shown, and a suitable backing 36 of opaque material used.

In Figures 10, 11 and 12 the translucent Lucite rods 42 are enclosed within the circular type light bulb 39. This provides maximum light within the rods 42 for inspection purposes. All light from the circular bulb 39 is enclosed or shielded from the working side and all observable light is from the rods 42. This device can be used in any position necessary and the rods can be backed with a suitable opaque material 43. Also, in this form of the invention the rods 42 are supported at the point of entry into the light enclosure.

By using fluorescent type of lighting instead of the incandescent bulb, the necessity of using the heat absorbing element is eliminated and the construction is simplified. The device shown in Figures 10, 11 and 12 provides a concentration of light within the Lucite rods 42 which can be used for inspection work requiring additional illumination.

I claim:

An inspection device comprising a base including spaced parallel vertically disposed side walls, a horizontally disposed bottom wall, and a top wall extending across said side walls, said top wall being provided with a plurality of openings therein, a light source positioned in said base and adapted to be connected to a source of electrical energy, a vertically disposed back wall extending upwardly from said bottom wall and secured thereto, an opaque member positioned on said back wall, a horizontally disposed flange extending forwardly from the top of said back wall, a plurality of translucent light conducting rods depending from said flange in spaced parallel relation to each other and having their lower ends shaped arcuately and arranged contiguous to said light source, and a heat absorbing glass member interposed between the lower ends of said rods and said light source.

References Cited in the file of this patent
UNITED STATES PATENTS

| Number | Name | Date |
|---|---|---|
| 769,348 | Junghans | Sept. 6, 1904 |
| 1,349,241 | Walsh | Aug. 10, 1920 |
| 1,700,208 | Paisseau | Jan. 29, 1929 |
| 2,015,730 | Rosin et al. | Oct. 1, 1935 |
| 2,040,264 | Maneini et al. | May 12, 1936 |
| 2,207,117 | Collins | July 9, 1940 |